United States Patent
Kozloski et al.

(10) Patent No.: US 10,169,988 B2
(45) Date of Patent: Jan. 1, 2019

(54) AERIAL DRONE FOR CORRECTING ERRATIC DRIVING OF A VEHICLE

(71) Applicant: International Business Machines Corporation, Armonk, NY (US)

(72) Inventors: James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

(*) Notice: Subject to any disclaimer, the term of this patent is extended or adjusted under 35 U.S.C. 154(b) by 177 days.

(21) Appl. No.: 15/297,278

(22) Filed: Oct. 19, 2016

(65) Prior Publication Data

US 2018/0233038 A1 Aug. 16, 2018

(51) Int. Cl.
*G08G 1/017* (2006.01)
*B60W 40/09* (2012.01)
(Continued)

(52) U.S. Cl.
CPC .......... *G08G 1/0175* (2013.01); *B60W 40/09* (2013.01); *B60W 50/14* (2013.01); *B64C 39/024* (2013.01);
(Continued)

(58) Field of Classification Search
CPC . B60W 2040/0818; B60W 2040/0827; B60W 2040/0836; B60W 2040/0845;
(Continued)

(56) References Cited

U.S. PATENT DOCUMENTS 6,084,510 A * 7/2000 Lemelson ............ G08B 15/004
340/539.13
2012/0019522 A1 1/2012 Lawrence et al.
(Continued)

FOREIGN PATENT DOCUMENTS

FR 3017585 A1 8/2015
JP 2008296682 A 12/2008
(Continued)

OTHER PUBLICATIONS

Anonymous, "Sleep-Deprived Driving". wikipedia.org, Wikimedia Foundation, Inc., Sep. 18, 2016. Web. Sep. 22, 2016. <https://en.wikipedia.org/wiki/Sleep-deprived_driving>.
(Continued)

*Primary Examiner* — Hongmin Fan
(74) *Attorney, Agent, or Firm* — Law Office of Jim Boice

(57) ABSTRACT

A computer-implemented method causes an amelioration of an erratic manner in which a vehicle is being driven. One or more processors receive, from at least one sensor associated with a vehicle, sensor readings indicating that the vehicle is being operated by a driver in an erratic manner. Processor(s) compute a risk R associated with the driver operating the vehicle in the erratic manner, and determine whether the risk R is above a predefined threshold. In response to determining that the risk R is above the predefined threshold, processor(s) deploy an aerial drone to a current location of the vehicle, and transmit instructions to the aerial drone to perform an action that causes an amelioration of the erratic manner in which the vehicle is being driven.

20 Claims, 8 Drawing Sheets

(51) Int. Cl.
*B60W 50/14* (2012.01)
*B64C 39/02* (2006.01)

(52) U.S. Cl.
CPC .. *B60W 2050/143* (2013.01); *B64C 2201/127* (2013.01); *B64C 2201/145* (2013.01)

(58) Field of Classification Search
CPC ......... B60W 2040/0872; B60W 40/09; B60W 40/10; B60W 40/107; B60W 40/109; B60W 50/14; B60W 50/143; B60W 50/146

See application file for complete search history.

(56) References Cited

U.S. PATENT DOCUMENTS

2014/0320318 A1 10/2014 Victor et al.
2016/0054143 A1 2/2016 Abuelsaad et al.

FOREIGN PATENT DOCUMENTS

WO 2014080387 A2 5/2014
WO 2014080388 A2 5/2014

OTHER PUBLICATIONS

P. Mell et al., "The NIST Definition of Cloud Computing", National Institute of Standards and Technology, Information Technology Laboratory, Sep. 2011, pp. 1-7.

\* cited by examiner

AERIAL DRONE FOR CORRECTING ERRATIC DRIVING OF A VEHICLE

BACKGROUND

The present disclosure relates to the field of aerial drones, and specifically to aerial drones that are capable of broadcasting messages. More specifically, the present disclosure relates to the use of an aerial drone to broadcast a message designed to ameliorate an erratic manner in which a vehicle is being driven.

An aerial drone, also known as an unmanned aerial vehicle (UAV) or a flying drone, is an unmanned airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

SUMMARY

A computer-implemented method causes an amelioration of an erratic manner in which a vehicle is being driven. One or more processors receive, from at least one sensor associated with a vehicle, sensor readings indicating that the vehicle is being operated by a driver in an erratic manner. Processor(s) compute a risk R associated with the driver operating the vehicle in the erratic manner, and determine whether the risk R is above a predefined threshold. In response to determining that the risk R is above the predefined threshold, processor(s) deploy an aerial drone to a current location of the vehicle, and transmit instructions to the aerial drone to perform an action that causes an amelioration of the erratic manner in which the vehicle is being driven.

The described invention may also be implemented in a computer system and/or as a computer program product.

DETAILED DESCRIPTION

Figure 1:
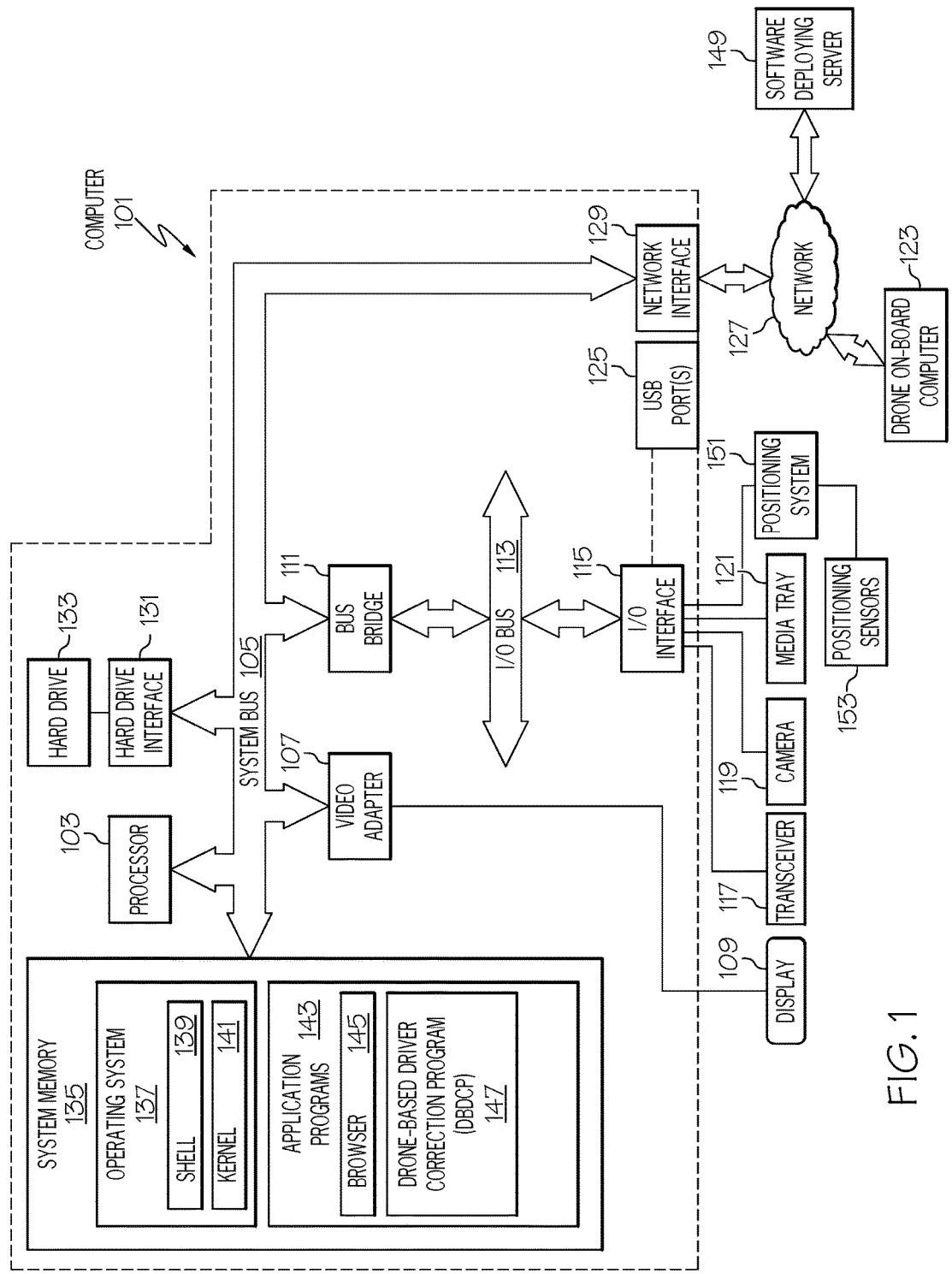
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or software deploying server 149 and/or positioning system 151 shown in FIG. 1, and/or drone on-board computer 223 shown in FIG. 2, and/or drone on-board computer 323 shown in FIG. 3, and/or drone controller device 401 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a transceiver 117 (capable of transmitting and receiving electromagnetic transmissions), a camera 119 (i.e., a digital camera capable of capturing still and moving images), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101, an aerial drone 200 shown in FIG. 2, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is also able to communicate (besides via transceiver 117) with a software deploying server 149 and/or other devices/systems (e.g., drone on-board computer 123 and/or a software deploying server 149) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Drone-Based Driver Correction Program (DBDCP) 147. DBDCP 147 includes code for implementing the processes described below, including those described in FIGS. 2-6. In one embodiment, computer 101 is able to download DBDCP 147 from software deploying server 149, including in an on-demand basis. In one embodiment, software deploying server 149 is able to execute one or more instructions from DBDCP 147 and provide the results to computer 101, thus relieving computer 101 from the need to utilize its internal processing power.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
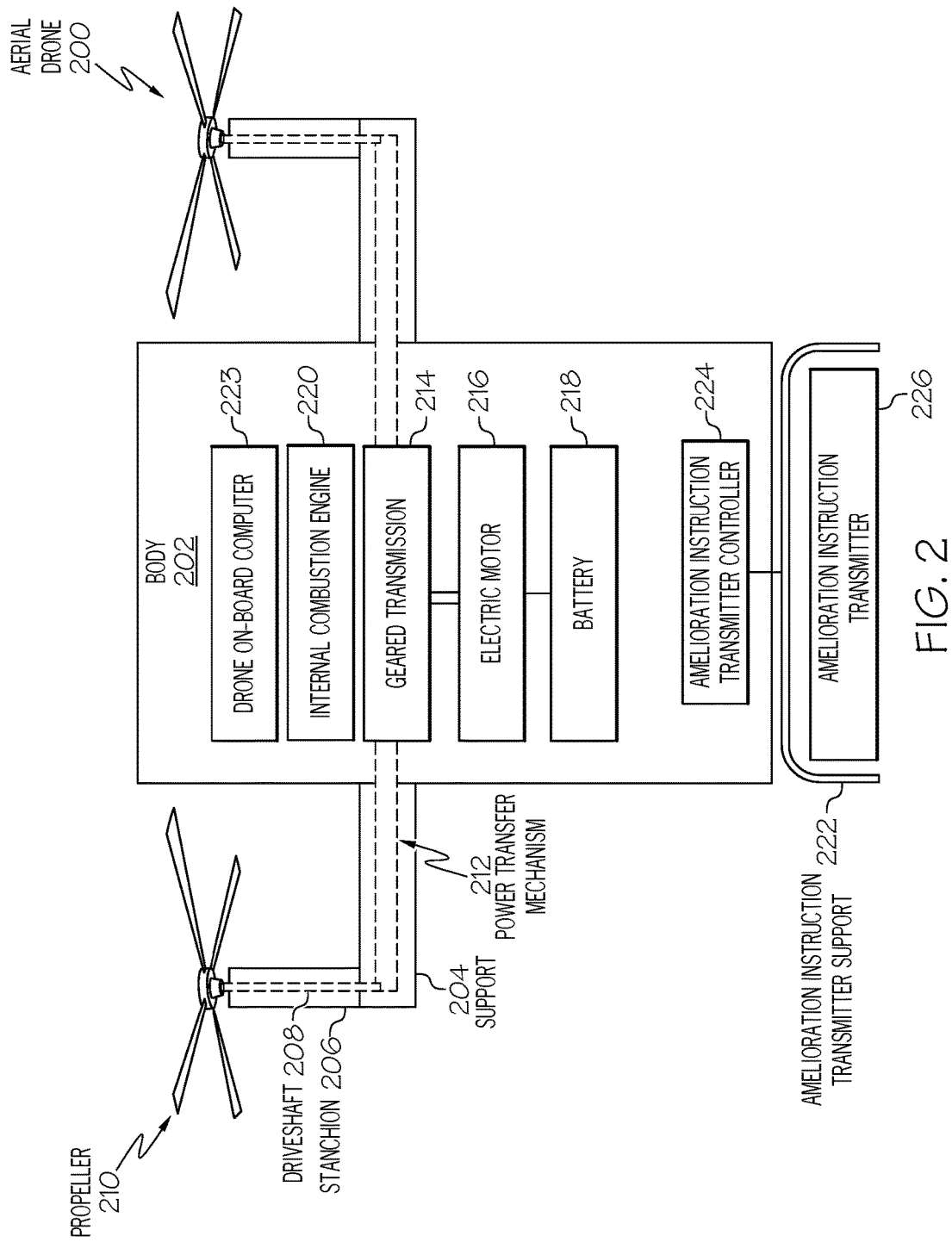
FIG. 2 depicts detail of an exemplary aerial drone as used in accordance with one or more embodiments of the present invention.

FIG. 2 illustrates an exemplary aerial drone 200 in accordance with one or more embodiments of the present invention. The terms "aerial drone", "drone", and "unmanned aerial vehicle" ("UAV") are used interchangeably herein to identify and describe an airborne vehicle that is capable of pilot-less flight.

As shown in FIG. 2, aerial drone 200 includes a body 202, which is attached to supports such as support 204. Supports such as support 204 support stanchions such as stanchion 206. Such stanchions provide a housing for a driveshaft within each of the stanchions, such as the depicted driveshaft 208 within stanchion 206. These driveshafts are connected to propellers. For example, driveshaft 208 within stanchion 206 is connected to propeller 210.

A power transfer mechanism 212 (e.g., a chain, a primary driveshaft, etc.) transfers power from a geared transmission 214 to the driveshafts within the stanchions (e.g., from geared transmission 214 to the driveshaft 208 inside stanchion 206), such that propeller 210 is turned, thus providing lift and steering to the aerial drone 200. Geared transmission 214 preferably contains a plurality of gears, such that a gear ratio inside geared transmission 214 can be selectively changed.

Power to the geared transmission 214 is selectively provided by an electric motor 216 (which is supplied with electrical power by a battery 218) or an internal combustion engine 220, which burns fuel from a fuel tank (not shown). In one or more embodiments of the present invention, the internal combustion engine 220 has greater power than the electric motor 216, since internal combustion engines are able to produce greater torque/power and have a greater range (can fly farther) than electric motors of the same size/weight.

Affixed to body 202 is an amelioration instruction transmitter support 222 that holds an amelioration instruction transmitter 226. Amelioration instruction transmitter 226 is device that is able to transmit instructions to a driver of a vehicle aurally, visually, and/or via an electromagnetic signal. That is, amelioration instruction transmitter 226 may be a speaker system (for sending aural instructions to the driver of the vehicle, a light and/or light array (for sending visual instructions to the driver of the vehicle), or an electromagnetic transceiver for transmitting and/or receiving radio frequency, infrared frequency, etc. carrier waves to a electromagnetic transceiver on the vehicle.

Figure 3:
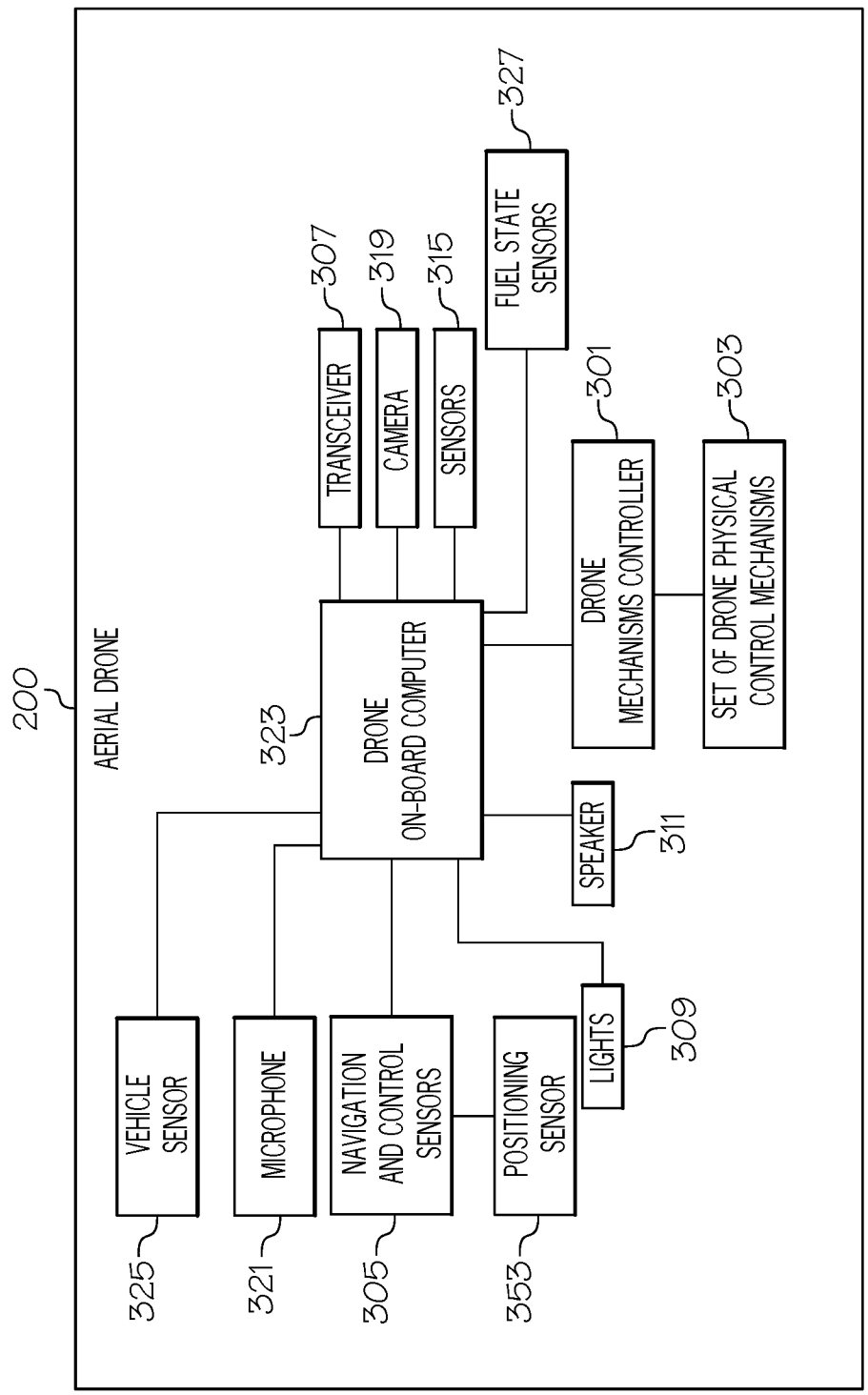
FIG. 3 illustrates control hardware and other hardware features of an exemplary aerial drone in accordance with one or more embodiments of the present invention.

With reference now to FIG. 3, additional exemplary hardware, including control hardware, within and/or affixed to the aerial drone 200 presented in FIG. 2 is depicted.

A drone on-board computer 323 (analogous to drone on-board computer 223 shown in FIG. 2) controls a drone mechanisms controller 301, which is a computing device that controls a set of drone physical control mechanisms 303. The set of drone physical control mechanisms 303 includes, but is not limited to, throttles for internal combustion engine 220 and/or electric motor 216, selectors for selecting gear ratios within the geared transmission 214, controls for adjusting the pitch, roll, and angle of attack of propellers such as propeller 210 and other controls used to control the operation and movement of the aerial drone 200 depicted in FIG. 2.

Whether in autonomous mode or remotely-piloted mode, the drone on-board computer 323 controls the operation of aerial drone 200. This control includes the use of outputs from navigation and control sensors 305 to control the aerial drone 200. Navigation and control sensors 305 include hardware sensors that (1) determine the location of the aerial drone 200; (2) sense other aerial drones and/or obstacles and/or physical structures around aerial drone 200; (3) measure the speed and direction of the aerial drone 200; and (4) provide any other inputs needed to safely control the movement of the aerial drone 200.

With respect to the feature of (1) determining the location of the aerial drone 200, this is achieved in one or more embodiments of the present invention through the use of a positioning system such as positioning system 151 (shown in FIG. 1), which may be part of the drone on-board computer 323, combined with positioning sensor 353 (e.g., accelerometers, global positioning system (GPS) sensors, altimeters, etc.). That is, positioning system 151 may use a global positioning system (GPS), which uses space-based satellites that provide positioning signals that are triangulated by a GPS receiver to determine a 3-D geophysical position of the aerial drone 200. Positioning system 151 may also use, either alone or in conjunction with a GPS system, physical movement sensors (i.e., positioning sensor 353) such as accelerometers (which measure changes in direction and/or speed by an aerial drone in any direction in any of three dimensions), speedometers (which measure the instantaneous speed of an aerial drone), air-flow meters (which measure the flow of air around an aerial drone), barometers (which measure altitude changes by the aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around aerial drone 200, the drone on-board computer 323 may utilize radar or other electromagnetic energy that is emitted from an electromagnetic radiation transmitter (e.g., transceiver 307 shown in FIG. 3), bounced off a physical structure (e.g., a building, bridge, or another aerial drone), and then received by an electromagnetic radiation receiver (e.g., transceiver 307). By measuring the time it takes to receive back the emitted electromagnetic radiation, and/or evaluating a Doppler shift (i.e., a change in frequency to the electromagnetic radiation that is caused by the relative movement of the aerial drone 200 to objects being interrogated by the electromagnetic radiation) in the received electromagnetic radiation from when it was transmitted, the presence and location of other physical objects can be ascertained by the drone on-board computer 323.

With respect to the feature of (3) measuring the speed and direction of the aerial drone 200, this is accomplished in one or more embodiments of the present invention by taking readings from an on-board airspeed indicator (not depicted) on the aerial drone 200 and/or detecting movements to the control mechanisms (depicted in FIG. 2) on the aerial drone 200 and/or the positioning system 151 discussed above.

With respect to the feature of (4) providing any other inputs needed to safely control the movement of the aerial drone 200, such inputs include, but are not limited to, control signals to direct the aerial drone 200 to make an emergency landing, etc.

Also on aerial drone 200 in one or more embodiments of the present invention are lights 309. Lights 309 are activated by drone on-board computer 323 to provide visual warnings, alerts, etc., and may be a component of the amelioration instruction transmitter 226 described in FIG. 2.

Also on aerial drone 200 in one or more embodiments of the present invention is a speaker 311. Speaker 311 is used by drone on-board computer 323 to provide aural warnings, alerts, etc., and may be a component of the amelioration instruction transmitter 226 described in FIG. 2.

Also on aerial drone 200 in one or more embodiments of the present invention are sensors 315. Examples of sensors 315 include, but are not limited to, air pressure gauges, chemical sensors, vibration sensors, etc., which detect a real-time operational condition of aerial drone 200 and/or an environment around aerial drone 200. Another example of a sensor from sensors 315 is a light sensor, which is able to detect direct light from sources including other drones, street lights, home lights, etc., in order to ascertain the environment in which the aerial drone 200 is operating. In another embodiment, sensor 315 may act as an environmental sensor able to detect other ambient conditions around the aerial drone 200. For example, sensor 315 may be a light sensor that detects ambient lighting conditions (as opposed to direct lighting sources); sensor 315 may be a weather sensor that detects ambient weather conditions such as rain, snow, fog, etc. using one or more of a thermometer, barometer, microphone, camera, moisture detector, etc.; sensor 315 may be a traffic sensor that detects ambient traffic conditions using a light sensor (for detecting oncoming headlights), a microphone (for detecting the sound of traffic), a camera (for photographing local traffic), etc.

Also on aerial drone 200 in one or more embodiments of the present invention is a camera 319 (analogous to camera 119 shown in FIG. 1), which is capable of capturing and sending still or moving visible light digital photographic images (and/or infrared light digital photographic images) to the drone on-board computer 323. These images can be used to determine the location of the aerial drone 200 (e.g., by matching to known landmarks), to sense other drones/obstacles, to determine speed (by tracking changes to images passing by) of the aerial drone, to record driving patterns (e.g., erratic driving) of a vehicle, etc.

Also on aerial drone 200 in one or more embodiments of the present invention is a microphone 321. In an embodiment, microphone 321 is an omnidirectional sensor that measures ambient noise (e.g., sound produced by the aerial drone 200). In the same or another embodiment, microphone 321 is a directional microphone (e.g., that captures sounds at some distance away from the aerial drone 200).

Also affixed to aerial drone 200 is a vehicle sensor 325. While environmental sensors 317 can detect traffic conditions (i.e., general pattern of local traffic), vehicle sensor 325 detects an individual oncoming vehicle and its state. For example, vehicle sensor 325 may be a Doppler-enabled transceiver that sends and receives an electromagnetic signal towards a vehicle (which is detected by camera 319), in order to detect the speed, direction, lateral movement, and current location of the vehicle.

Also on aerial drone 200 in one or more embodiments of the present invention is a fuel state sensor 327. In an embodiment of the present invention, fuel state sensor 327 (i.e., a fuel level sensor) is a sensor within a liquid or gas fuel tank (e.g., gasoline tank, a compressed gas cylinder, etc.). In another embodiment of the present invention, the fuel state sensor 327 is a battery level indicator (e.g., a voltage sensor) that indicates how much stored electricity remains in the battery 218 shown in FIG. 2. In another embodiment of the present invention, the fuel state sensor 327 is a combination of a liquid/gas fuel sensor and a battery level indicator.

Erratic driving (i.e., a driver operating a vehicle in an erratic manner) is defined as driving a vehicle in a manner that does not comport with current environmental and traffic conditions. For example, while jerking the steering wheel of a car sharply to the side while driving along a straight stretch of road would be appropriate to avoid hitting a deer that has jumped in front of the vehicle, moving the steering wheel in such a manner (and thus the resulting movement of the vehicle) would be "erratic" if there was no reason to do so (based on current road, traffic, weather, etc. conditions about the vehicle). Such erratic driving is often the result of driver impairment.

Many adult drivers admit that they have driven a vehicle while feeling drowsy, and a significant amount of drivers have fallen asleep at the wheel of a vehicle during their driving history. Such impaired driving is often the result of sleep deprivation caused by sleep disorders, overwork, shift work, etc. Thus, sleep deprivation increases the risk of a sleep-related crash. That is, the less people sleep, the greater the risk of a vehicular accident.

Furthermore, erratic behavior can be the result of a person's "biological time clock". Each person's body has its own circadian rhythm (daily "biological time clock"), which may cycle through every 24 hours or may cycle through on more or less than 24 hours. Due to such biological time clocks/rhythms, night-time driving is often risky as sleep becomes an irresistible urge, especially between the hours of midnight and 6 a.m. A sleepy time period for many persons is also "programmed" for the afternoon, which makes the afternoon a risky time. The biological master clock in the hypothalamus is the suprachiasmatic nucleus or SCN. This SCN provides the main control of the circadian rhythms for sleep, body temperature and other functions.

In order to address the hazards presented by erratic behavior of vehicle drivers, the present invention provides a method and system for detecting a possible concern with a vehicle (e.g., a vehicle that is driven erratically by a tired or impaired driver), a risk management module for estimating a risk R with that person's driving, and then based on R, an aerial drone (i.e., a flying drone) that is deployed to shepherd the driver. In one or more embodiments of the present invention, the risk R is computed by taking into account any of: degree of erratic driving, weather conditions, road conditions, time of day, ambient or forecast traffic, risk of an accident, etc.

The means for detecting the erratic vehicle may be based on video of a vehicle, among other methods.

The "good shepherd" drone may be docked nearby (e.g., at the side of a road, on a lamp post, on a vehicle, etc.)

The shepherd drone may do any of: flashing a message, blinking a light, flashing an arrow, offering to guide the driver to a safe area or a rest stop, issuing radio messages to the driver, emitting a certain frequency that will wake up/shake up the driver, etc.

Optionally, in some cases, the drone may be able to use video processing to determine if a driver is slumped over a steering wheel, has 90% closed eyes, etc. In one embodiment, privacy is preserved by requiring that such video processing does not store any video taken by the drone. If a driver has a tendency to be drowsy, that person may wish to "opt in" for such a service.

The car may be autonomous (e.g. it may be driving erratically due to a software or hardware fault).

The risk assessment and shepherding actions may be learned and improved (through time) for different cohorts of drivers (e.g. city drivers, rural drivers, sports car owners, pre-Alzheimer's, etc). Some people will disclose information about themselves, as they will benefit from the "good shepherd" drone. Some may provide feedback as to whether the "good shepherd" drone was effective and useful.

In some cases, aerial drones may be provided by a municipality and docked on helper vehicles, in the hopes of decreasing accidents, controlling road traffic, and the like.

In one embodiment, if an accident takes place, the aerial drone will flash an emergency light (SOS), to assist while hovering over a car, etc.

In some cases, if the drone is aware of safe parking spaces, pull-offs on the side of the road, etc., the shepherd drone may guide the vehicle to a parking space or area within a nearby environment. The drone may select such places based on safety, lighting conditions, etc. If such places have lights, the drone may actually select lighting devices within the environment based on a location of the selected parking spaces, and send a signal to the lighting devices to generate a lighting pattern visible to a driver of the vehicle. This lighting pattern, along with the drone, directs the driver to navigate the vehicle toward the parking area or space. Similarly, the drone may assist the vehicle (or driver) to navigate using radio navigation algorithms based on beacon signals broadcasted from street-side devices, such as lighting devices near safe places to park or pull off the road. The street lamps may pulse, in conjunction with guidance from drone, to assist the vehicle (or driver).

The drone may emit a loud rumbling sound to simulate ingraining roads with dents, known as rumble strips in the United States, which cause a noise when drivers wander out of their lane.

The driver may supply some indication of his or her sleep schedule, electronic calendar, and the like, which may assist with fatigue estimates.

A vehicle may report to the drone some aspect of the driver's state, such as distraction level or fatigue. In some cases, the vehicle may optionally use haptic feedback by monitoring driver's posture on the car seat, skin conductivity through contact with the steering wheel, grip pressure on the steering wheel, etc. in order to forecast fatigue state and use this to notify nearby drones.

The present invention may be particularly useful to a long haul/transportation truck driver, who may tend to doze off at the wheel. Often, truck drivers travel in pairs (driver and the sleeper in the cabin), so the in-vehicle system can differentiate between the states of the multiple passengers. The "good shepherd" drone may also employ appropriate methods to wake up the sleeping co-driver, who can help take over the driving. The "good shepherd" drone may also optionally act as a partial lock on the wheel of the vehicle, discouraging a vehicle's movement until the driver is rested.

Figure 4:
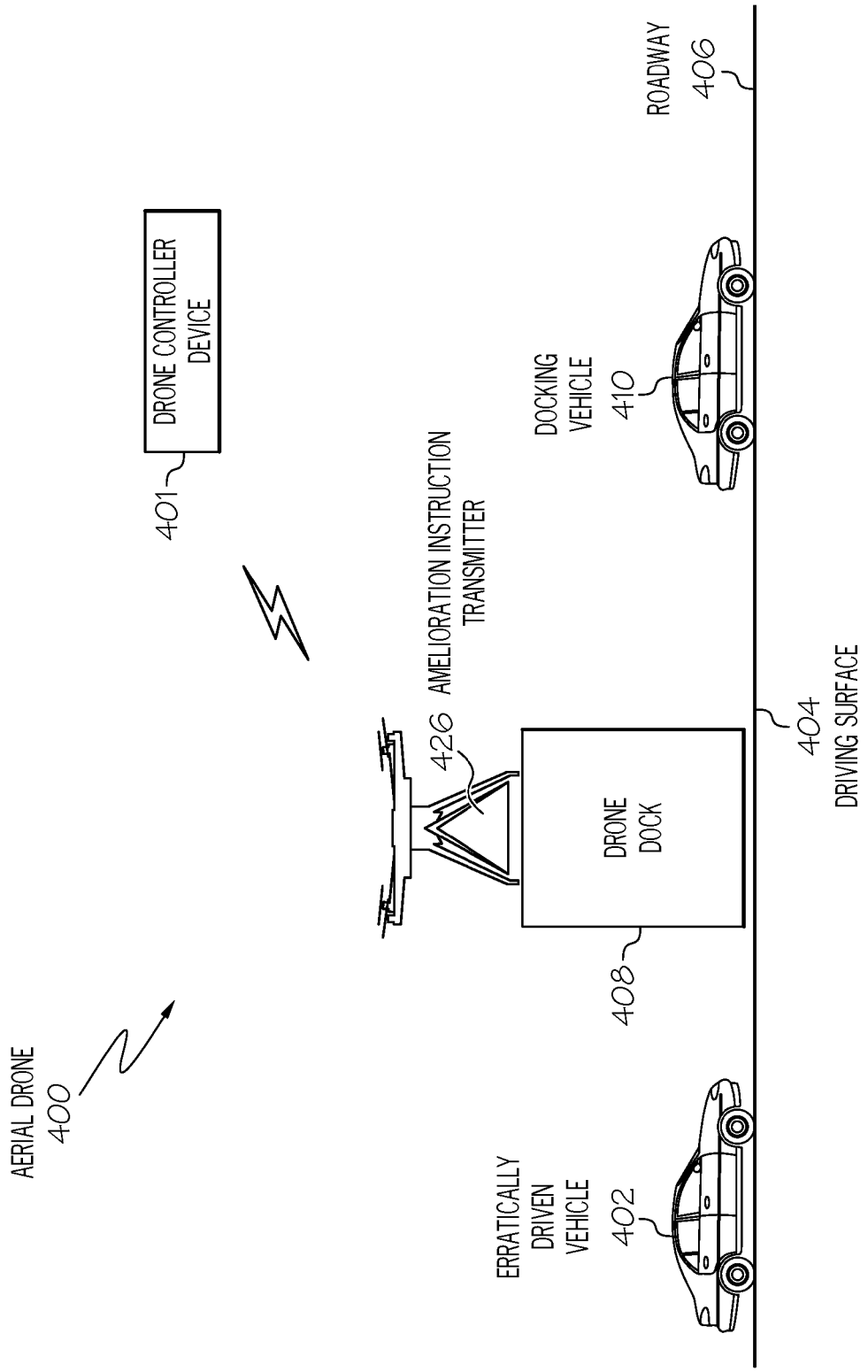
FIG. 4 depicts an exemplary aerial drone being utilized to intervene with a vehicle that is being driven in an erratic manner on a roadway.

With reference now to FIG. 4, an exemplary aerial drone 400 (analogous to the aerial drone 200 depicted in FIG. 2) is depicted being utilized to intervene with an erratically driven vehicle 402 that is being driven in an erratic manner on a driving surface 404 of a roadway 406.

Assume that erratically driven vehicle 402 is detected by aerial drone 400 and/or a drone controller device 401, each of which have sensors, camera, microphones, etc. that are able to 1) detect the presence of an oncoming vehicle such as the erratically driven vehicle 402, and 2) determine that the erratically driven vehicle 402 is in fact being driven erratically (i.e., is moving in a manner that indicates that the driver does not have proper control of the erratically driven vehicle 402), according to certain predefined parameters. That is, if the aerial drone 400 and/or drone controller device 401 detect the erratically driven vehicle 402 speeding, switching lanes, swerving, braking for no apparent reason, driving far too slow for traffic and road conditions, etc., then an assumption is made that the driver of the erratically driven vehicle 402 needs assistance, guidance, directions, an intervention, etc.

As shown in FIG. 4, the aerial drone 400 may be pre-positioned at certain locations (e.g., known hazardous stretches of roadway 406) on a drone dock 408, which provides a secure dock (and optionally, a charging/fueling station) for the aerial drone 400.

Figure 5:
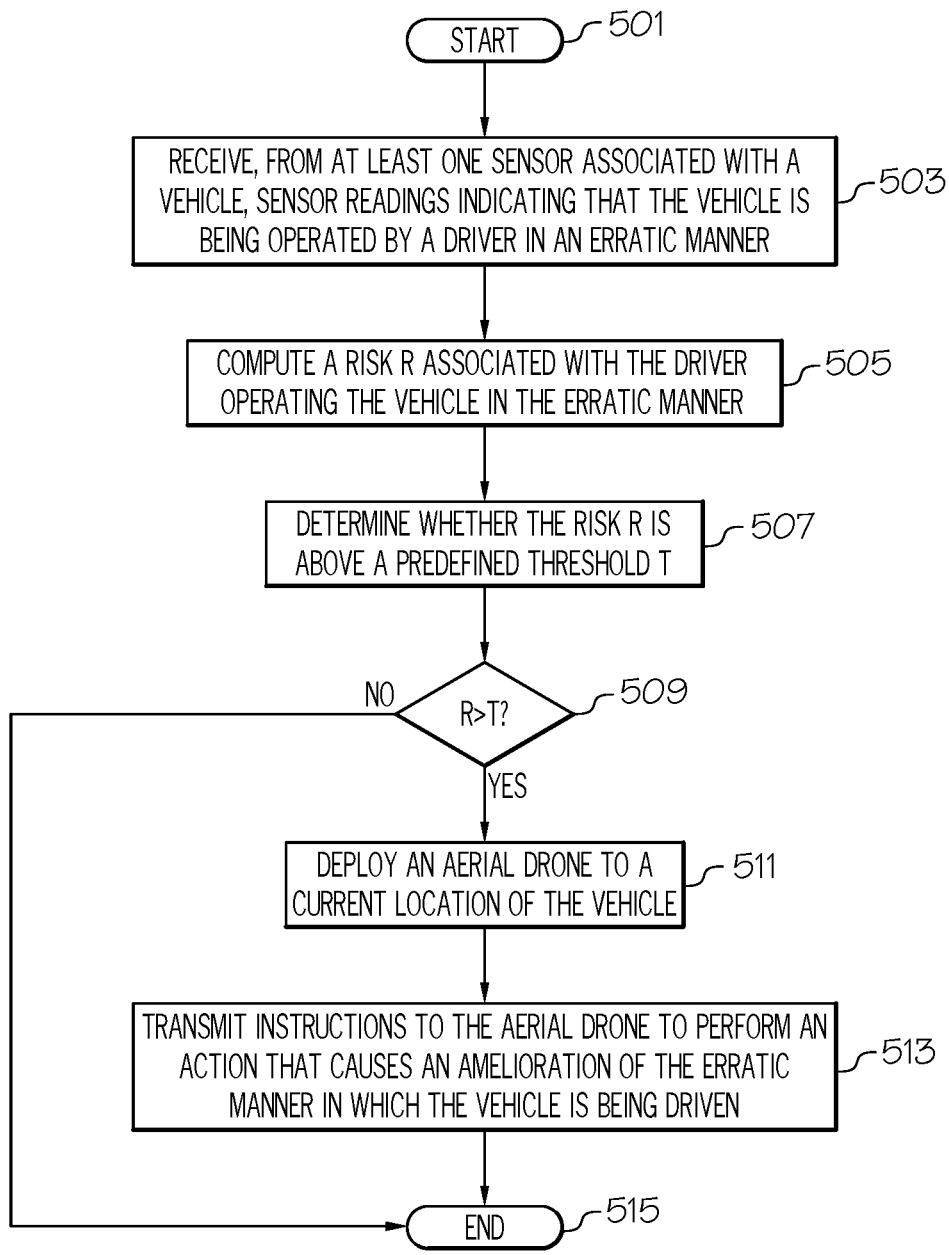
FIG. 5 is a high-level flow chart of one or more steps performed by one or more computing devices and/or an aerial drone and/or other hardware devices to ameliorate erratic driving of a vehicle in accordance with one or more embodiments of the present invention.

With reference now to FIG. 5, a high-level flow chart of one or more steps performed by one or more computing devices and/or an aerial drone and/or other hardware devices to ameliorate erratic driving of a vehicle in accordance with one or more embodiments of the present invention is presented.

After initiator block 501, one or more processors (e.g., within the aerial drone 400 and/or the drone controller device 401 shown in FIG. 4) receive, from at least one sensor associated with a vehicle, sensor readings indicating that the vehicle is being operated by a driver in an erratic manner, as described in block 503. Examples of this at least one sensor are described in detail below with reference to FIG. 6. As an overview however, such sensor(s) are able to detect real time conditions of the erratically driven vehicle 402 and/or the driving surface 404 shown in FIG. 4, and/or the real time state of the driver of the erratically driven vehicle 402.

With reference now to block 505 in FIG. 5, the processor(s) compute a risk R associated with the driver operating the vehicle in the erratic manner. This risk R is a value that describes how likely the occurrence of an untoward event (e.g., a crash, damage to the vehicle, injury to the occupants of the vehicle, etc.) is considering the current erratic behavior of the vehicle. The risk R may be calculated based on known pre-crash driving patterns of vehicles (e.g., speeding, swerving, etc.), driver conditions (e.g., asleep at the wheel), vehicle conditions (e.g., software glitches that cause an engine to autonomously accelerate without warning), roadway conditions (e.g., icing, darkness, etc.), time of day (e.g., after midnight), etc. that led to previous untoward events.

As described in block 507 in FIG. 5, the processor(s) determine whether the risk R is above a predefined threshold T. That is, assume that one or more descriptive and (weighted and/or unweighted) quantified factors about erratically driven vehicle 402 (e.g., the amount of swerving that is occurring, how fast the vehicle is driving, the level of darkness, etc.) are added up to reach a value "R". If this sum "R" is below a predetermined value "T", then no action is taken. However, if this sum "R" is above "T", then the aerial drone 400 shown in FIG. 4 will be deployed to "shepherd" the driver of the erratically driven vehicle 402.

Thus, a query is made in query block 509 as to whether R is above T. If not, then the process ends at terminator block 515. However, if R is greater than T, then (as shown in block 511) the processor(s) deploy an aerial drone (e.g., aerial drone 400 shown in FIG. 4) to a current location of the vehicle.

As described in block 513, the processor(s) then transmit instructions to the aerial drone (e.g., from a transceiver on drone controller device 401 to the transceiver 307 shown in the aerial drone 200 in FIG. 3) to perform an action that causes an amelioration of the erratic manner in which the vehicle is being driven.

The flow chart ends at terminator block 515.

In an embodiment of the present invention, the at least one sensor is a video camera, which may be within the aerial drone 400 and/or the drone controller device 401 shown in FIG. 4, or may be a component of the erratically driven vehicle 402 shown in FIG. 4. For example, consider vehicle 602 depicted in FIG. 6 (analogous to erratically driven vehicle 402 shown in FIG. 4). Vehicle 602 includes a roadway camera 604, which is able to capture images of the roadway 406 shown in FIG. 4. These images are then processed by processor(s) within drone controller device 401 to determine that the vehicle is being operated by the driver in the erratic manner. That is, the movement of the video feed captured by roadway camera 604, which is then sent via transceiver 616 in FIG. 6 to the drone controller device 401 (and/or directly to the aerial drone 400 shown in FIG. 4) is analyzed to describe the vehicle 602 as being driven erratically.

In another embodiment, the video is taken by the drone controller device 401 (e.g., when mounted next to roadway 406 for monitoring the roadway 406) or the aerial drone 400 shown in FIG. 4. This video captures movement of the erratically driven vehicle 402, thus allowing the processor(s) within the drone controller device 401 and/or the aerial drone 400 to determine that the erratically driven vehicle 402 is in fact moving erratically.

Figure 6:
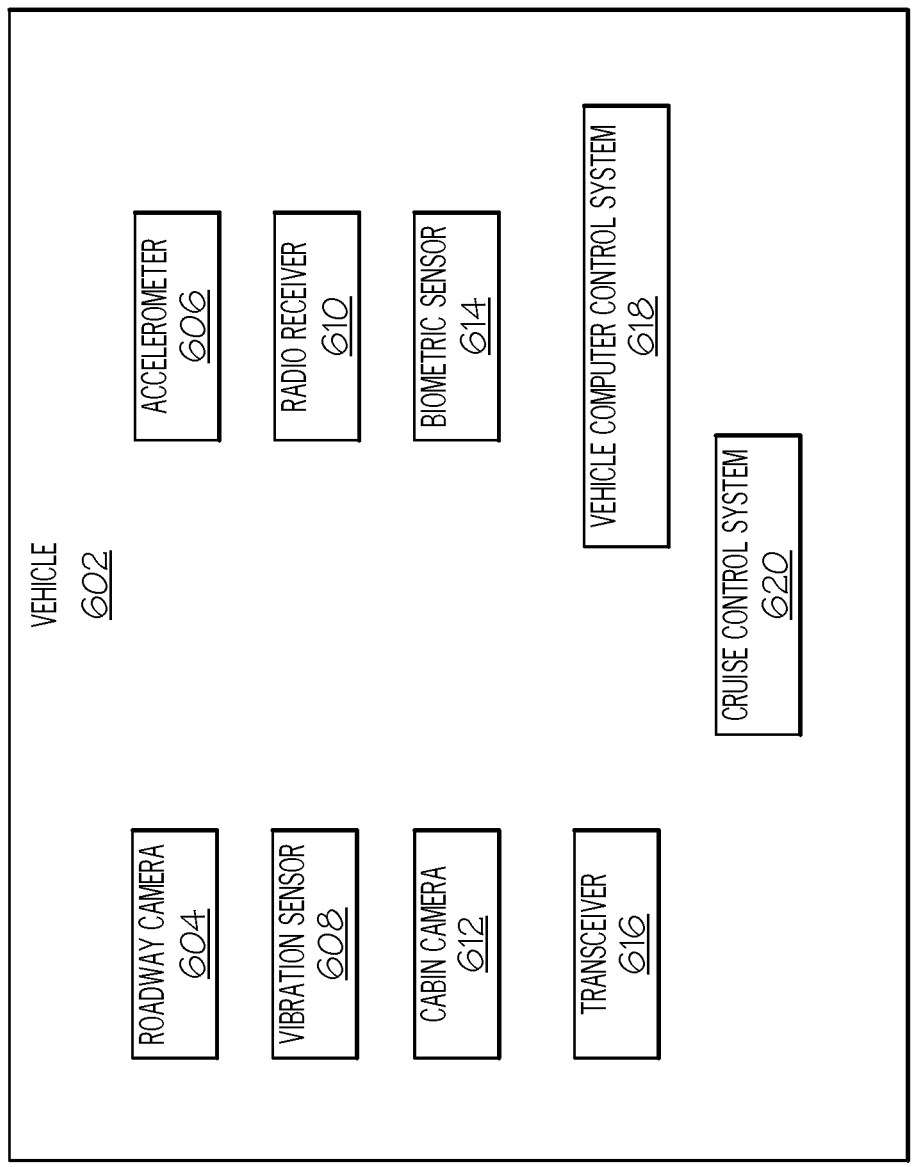
FIG. 6 illustrates additional detail of hardware components of a vehicle 602 used in one or more embodiments of the present invention.

In an embodiment of the present invention, the at least one sensor is an accelerometer on the vehicle (e.g., accelerometer 606 shown in FIG. 6). Acceleration readings from accelerometer 606 describe a real-time motion (e.g., speed, lateral movement, bouncing, etc.) of the vehicle 602. Thus, in this embodiment, one or more processors (e.g., within drone controller device 401) perform an analysis of the accelerometer readings (which have been received from the transceiver 616 within the vehicle 602) in order to determine that the vehicle is being operated by the driver in the erratic manner. That is, if the accelerometer readings show that the vehicle is swerving, suddenly stopping, etc. for no apparent reason (as confirmed by video images captured by the erratically driven vehicle 402 and/or the aerial drone 400 and/or the drone controller device 401), then there is confirmation that the erratically driven vehicle 402 is in fact being driven in an erratic manner.

In an embodiment of the present invention, the risk R is computed based on a degree of erratic driving of the vehicle detected by the sensor associated with the vehicle. That is, if sensor readings show only a slight amount of lateral movement (lane drift), then the risk R is low, since the degree of erratic driving is low. However, if sensor readings show a high degree of lateral movement (swerving between lanes), then the risk R is high, since the degree of erratic driving is high.

In an embodiment of the present invention, the risk R is computed based on one or more factors from a group of factors consisting of real-time weather conditions at a current location of the vehicle, real-time road conditions at the current location of the vehicle, a time of day at the current location of the vehicle, and real-time traffic conditions at the current location of the vehicle. That is, the risk R (which determines whether or not aerial drone 400 will be deployed and activated), may be based on general inclement weather ("real-time weather conditions at a current location of the vehicle" that may cause poor visibility when rain/snow hits the windshield of the vehicle), icing/rain on the roadway that may cause the vehicle to lose traction ("real-time road conditions at the current location of the vehicle"), darkness due to the time of day ("a time of day at the current location of the vehicle", resulting in poor visibility for the driver), and the amount of traffic on the roadway ("real-time traffic conditions at the current location of the vehicle", which may increase the risk R of an accident or other untoward event/condition).

In an embodiment of the present invention, the risk R is computed based on predicted traffic conditions at a future location of the vehicle. That is, rather than reacting to traffic conditions at the location of the vehicle 402, the system will determine the risk R (and thus the decision of whether or not to launch the aerial drone 400) based on traffic further ahead on the roadway 406, thus allowing the system to proactively guide the erratically driven vehicle 402 to correct the driving state before reaching the upcoming traffic conditions. That is, the erratically driven vehicle 402 may be slightly speeding and swerving at one area of roadway 406, which is traffic free and thus causes no real danger. However, such slight speeding and swerving will be hazardous at another area of roadway 406, due to the change in traffic. As such, the aerial drone 400 will instruct the driver of the erratically driven vehicle 402 to correct his/her driving before reaching the heavy traffic that is up ahead.

In an embodiment of the present invention, the aerial drone is docked within a predetermined distance of a current location of the vehicle, such as on the drone dock 408 shown in FIG. 4. For example, the aerial drone 400 shown in FIG. 4 may be located at the side of roadway 406, and may be stationary (e.g., on a lamp post) or mobile (e.g., mounted on another vehicle, such as docking vehicle 410 shown in FIG. 4).

In one or more embodiments of the present invention, the action that causes the amelioration of the erratic manner in which the vehicle is being driven the aerial drone is to guide the driver (or vehicle) to safe parking spaces, pull-offs on the side of the road, etc. The aerial drone may select such places based on safety, lighting conditions, etc. If such places have lights, the drone may select lighting devices within the environment based on a location of the selected parking spaces, and send a signal to the lighting devices to generate a lighting pattern visible to a driver of the vehicle. That is, assume that the aerial drone 400 is to guide the erratically driven vehicle 402 to a safe parking place, in order to allow the driver a chance to rest. In order to guide the driver to the safe parking place, the aerial drone 400 will transmit a signal from its amelioration instruction transceiver to a light at the safe parking place. This light is equipped with a transceiver that receives the signal form the aerial drone 400 to turn on the light at the safe parking place, thus guiding the driver of the erratically driven vehicle 402 to that location.

In an embodiment of the present invention, the action that ameliorates the erratic manner in which the vehicle is being driven is a flashing of a message from a display on the aerial drone. For example, assume that the aerial drone 400 wants to visually warn the driver of erratically driven vehicle 402 that he/she is driving erratically. As such, the aerial drone 400 will use the amelioration instruction transmitter 426 (configured as a light display) to flash a message, blink a light, flash an arrow, show directions to a safe area or a rest stop, etc. to the driver of the erratically driven vehicle 402.

In an embodiment of the present invention, one or more processors (e.g., with aerial drone 400 and/or drone controller device 401) receive a vibration sensor signal from a vibration sensor on the vehicle (e.g., vibration sensor 608 depicted in vehicle 602 in FIG. 6) indicating that the vehicle is traveling over ingrained warning dents (known in the United States as rumble strips) on a roadway on which the vehicle is traveling for longer than a predefined length of time. In response to receiving the vibration sensor signal from the vibration sensor on the vehicle indicating that the vehicle is traveling over ingrained warning dents on the roadway on which the vehicle is traveling for longer than the predefined length of time, the processor(s) deploy the aerial drone to the current location of the vehicle. That is, if the vibration sensor 608 detects that the vehicle 602 is driving on the rumble strips (which are next to the shoulder of the roadway 406 depicted in FIG. 4) for longer than some predefined length of time (e.g., more than three seconds), then the aerial drone 400 will be deployed to the erratically driven vehicle 402.

In an embodiment of the present invention, the action by the aerial drone that causes an amelioration of the erratic manner in which the vehicle is being driven is a broadcast via a speaker on the aerial drone of a rumbling sound that simulates a sound caused by an interaction between tires on the vehicle and ingrained warning dents on a roadway on which the vehicle is traveling. That is, assume that roadway 406 has no "rumble strips" or that the erratically driven vehicle 402 is not actually driving over rumble strips that are on the roadway 406. Nonetheless, the sound of driving over such rumble strips is instantly recognizable by drivers as an indication that their vehicle is leaving the main lane of a roadway. As such, the aerial drone 400 will broadcast the sound of driving over rumble strips from the amelioration instructions transmitter 428, which is now configured as a loud speaker system.

In an embodiment of the present invention, the action that causes an amelioration of the erratic manner in which the vehicle is being driven is a transmission of a radio message to the driver, wherein the radio message causes a radio on the vehicle to generate a verbal instruction to the driver to alter how the vehicle is being driven. For example, assume that aerial drone 400 has determined (or has been instructed by drone controller device 401) that erratically driven vehicle 402 is in fact being driven in an erratic manner. As such, the amelioration instruction transmitter 426 (now configured as a radio transmitter) will broadcast a radio message to the radio receiver 610 depicted in FIG. 6, causing the radio (radio receiver 610) in the vehicle 602 to aurally broadcast (through a speaker in the radio) an instruction (e.g., "Pull over and rest") to the driver.

In an embodiment of the present invention, the action that causes an amelioration of the erratic manner in which the vehicle is being driven is a transmission of a radio message to the driver, wherein the radio message causes a radio on the vehicle to emit a sound of a predetermined frequency volume that will capture the attention of the driver. That is, the amelioration instruction transmitter 426 (now configured as a radio transmitter) will broadcast a radio message to the radio receiver 610 depicted in FIG. 6, causing the radio (radio receiver 610) in the vehicle 602 to aurally broadcast (through a speaker in the radio) a high pitched warning sound that is recognized by the driver as a warning signal. Alternatively, the aerial drone 400 will send a message to radio transmitter outside of the aerial drone 400 (not shown), directing that radio transmitter to broadcast the radio message to the radio receiver 610.

In an embodiment of the present invention, the at least one sensor is a video camera (e.g., cabin camera 612 shown in FIG. 6, which is aimed at the driver of the vehicle 602). Thus, the sensor readings used to determine that the vehicle is being erratically driven are based on a video feed from the video camera showing the driver, not the movement of the vehicle. As such, one or more processors (e.g., within aerial drone 400 and/or drone controller 401) perform a video analysis of the video feed to determine that the driver is in a physical position that indicates a lack of control of the vehicle (e.g., the driver is slumped over the steering wheel, has his/her eyes closed by 90%, etc.). As such, the processor(s) then determine that the erratic manner in which the vehicle is being driven is due to the lack of control of the vehicle being demonstrated by the driver. That is, the processor(s) determine that the driver is not in control, leading to the conclusion that the vehicle is being driven erratically, leading to the deployment of the aerial drone.

In an embodiment of the present invention, the at least one sensor is a biometric sensor, such as the biometric sensor 614 shown in vehicle 602 in FIG. 6. This biometric sensor may be a electromyography (EMG) sensor that detects muscle movement of the driver, a respiration sensor (that detects a slow breathing rate indicative of the driver being asleep), etc. The processor(s) then analyze the output of the biometric sensor in order to determine that the driver is in a physiological condition that indicates a lack of ability by the driver to control the vehicle (e.g., the driver is asleep, is not facing the front, etc.). Based on this analysis, the processor(s) determine that the erratic manner in which the vehicle is being driven is due to the lack of ability by the driver to control the vehicle. That is, the vehicle 602 is able to report (via transceiver 616) to the aerial drone 400 and/or drone controller device 401 the driver's state, such as his/her distraction level, fatigue, positioning, etc.

In an embodiment of the present invention, assume that erratically driven vehicle 402 is a first vehicle (for purposes of identification), and that the driver of the first vehicle is a first driver (again, for purposes of identification). In this embodiment, the first driver of the first vehicle is assigned by one or more processors to a cohort of other drivers that share a set of common traits with the first driver, where the other drivers historically have driven other vehicles. The processor(s) identify prior historical actions that aerial drones have performed to cause an amelioration of erratic movements of the other vehicles that were driven by the other drivers, and then transmit instructions to the aerial drone to perform one or more of the prior historical actions. For example, assume that the cohort of other drivers (to which the driver of the erratically driven vehicle 402 is now also a member) all share a certain trait (e.g., they are all city drivers, rural drivers, sports car owners, have a certain medical condition, share a certain schedule (as obtained from their respective electronic calendars), etc). As such, the system (e.g., drone controller device 401) is able to perform a risk assessment for the driver of the erratically driven vehicle 402, and to generate shepherding actions that have been learned (through time) based on the experiences of the other members of the cohort of drivers. Thus, the cohort is used to determine which driver(s) are most at risk.

For example, historical data (e.g., from crash reports) may show that a certain cohort of persons having particular work schedules (e.g., shift workers), sleep disorders, sleep patterns, etc. may have a higher incidence of accidents. As such, if the driver of erratically driven vehicle 402 matches the profile of members of this cohort, then this information may be used to deploy the aerial drone 400 to the location of the erratically driven vehicle 402 that this driver is controlling.

While the present invention is described primarily with regard to a driver who is in error, in one embodiment of the present invention the erratically driven vehicle 402 may have a mechanical, hardware and/or software fault that is causing the erratic movement of the erratically driven vehicle 402. For example, one or more processors (e.g., within aerial drone 400 and/or drone controller device 401) may determine that the erratic manner in which the vehicle is being driven is being caused by a software error in a control system for the vehicle (e.g., vehicle computer control system 618 shown in vehicle 602 in FIG. 6). For example, the vehicle computer control system 618 may be a processor that controls a cruise control system 620 for the vehicle 602. If there is a software glitch in the vehicle computer control system 618, then the drone controller device 401 can send an instruction (e.g., a software patch) to the transceiver 618, directing the vehicle computer control system 618 to install the software patch.

That is, in response to determining that the erratic manner in which the vehicle is being driven is being caused by the software error in the control system for the vehicle, the processor(s) transmit instructions to the vehicle to correct the software error.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
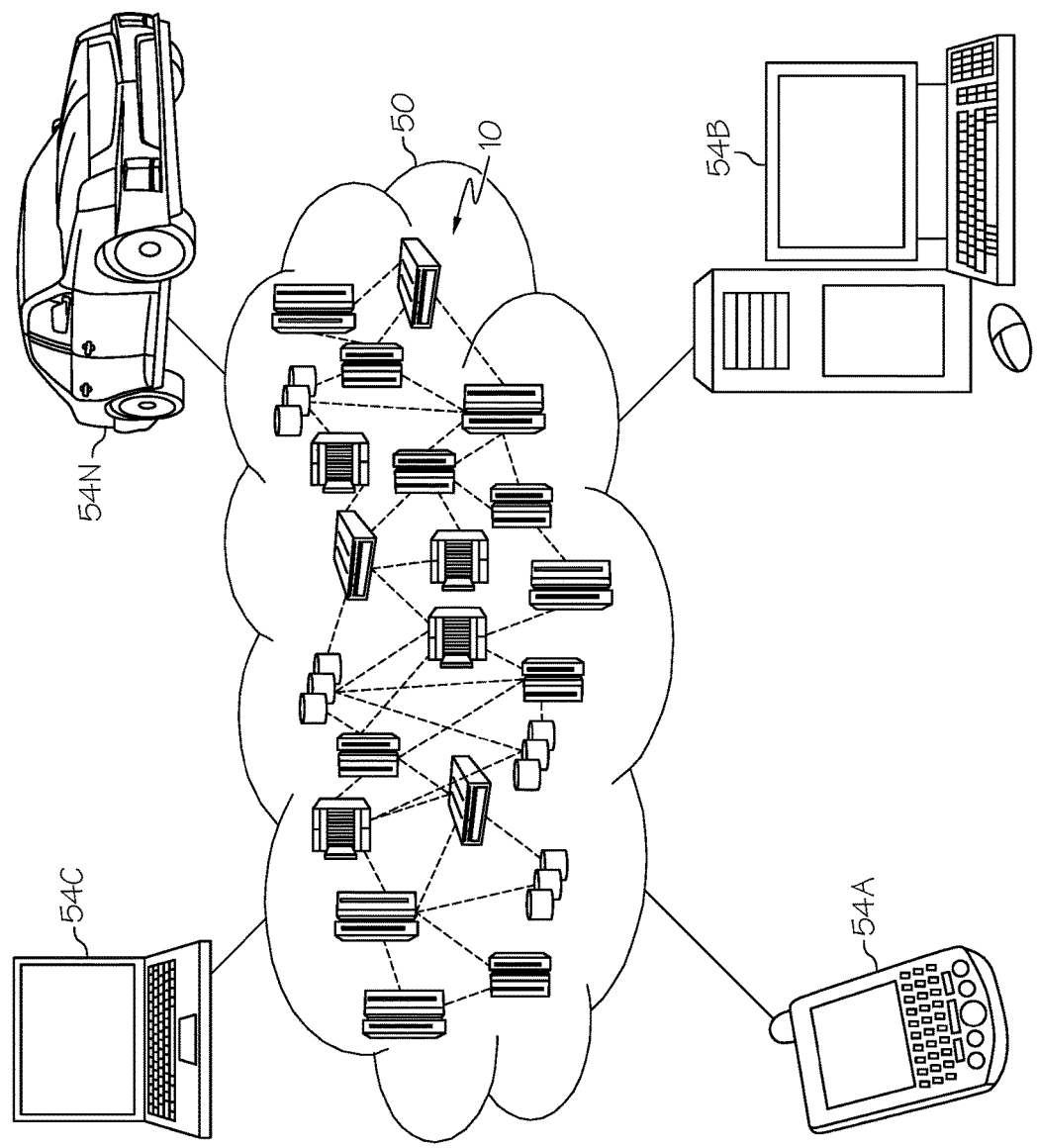
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
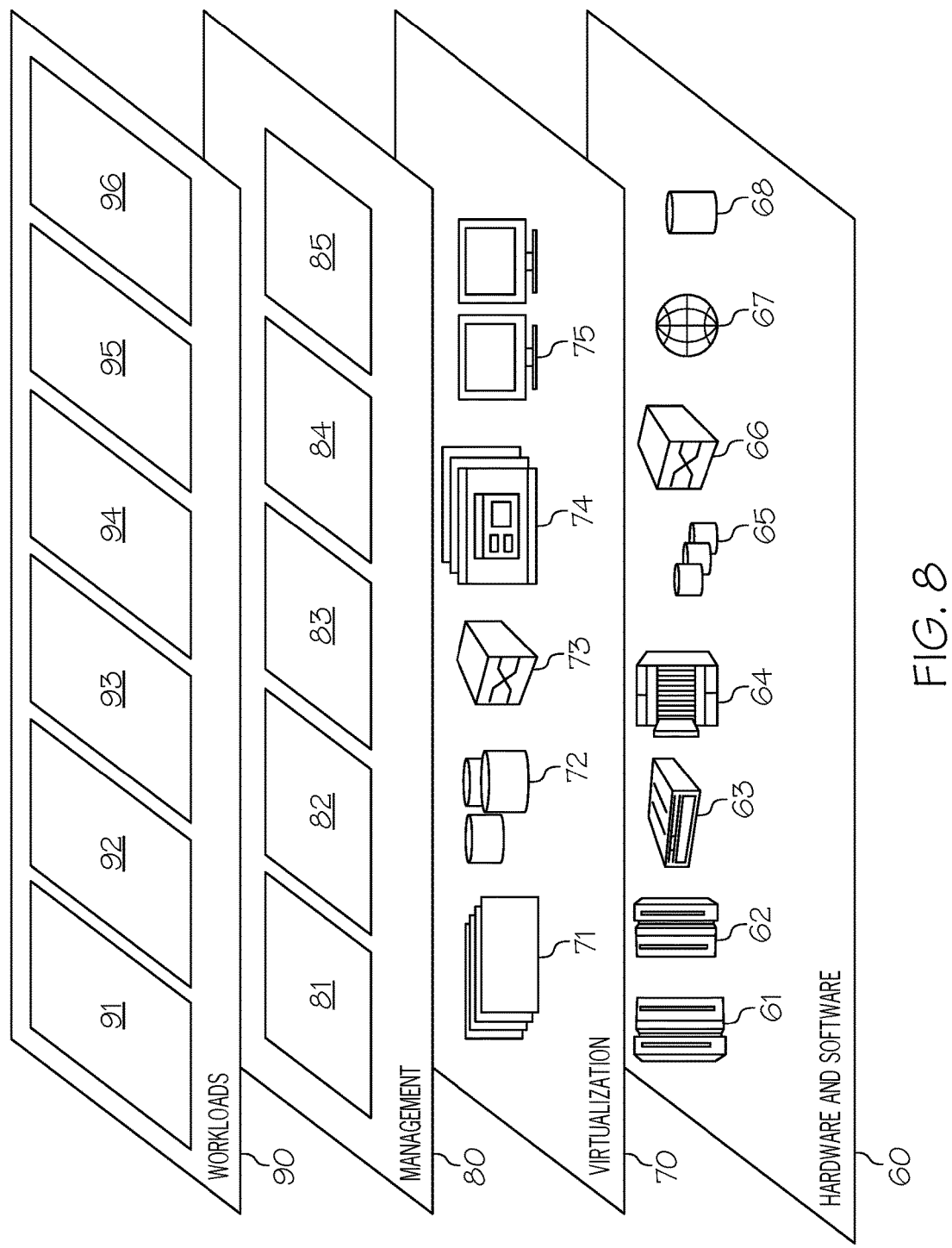
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drone control processing 96 for performing one or more functions described herein for the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
    receiving, by one or more processors and from at least one sensor associated with a vehicle, sensor readings indicating that the vehicle is being operated by a driver in an erratic manner;
    computing, by one or more processors, a risk R associated with the driver operating the vehicle in the erratic manner;
    determining, by one or more processors, whether the risk R is above a predefined threshold T;

in response to determining that the risk R is above the predefined threshold T, deploying, by one or more processors, an aerial drone to a current location of the vehicle; and transmitting, by one or more processors, instructions to the aerial drone to perform an action that causes an amelioration of the erratic manner in which the vehicle is being driven.

2. The computer-implemented method of claim 1, wherein the at least one sensor is a video camera, wherein the sensor readings are a video feed from the video camera, and wherein the computer-implemented method further comprises:

performing, by one or more processors, a video analysis of the video feed to determine that the vehicle is moving in the erratic manner.

3. The computer-implemented method of claim 1, wherein the at least one sensor is an accelerometer on the vehicle, wherein the sensor readings are accelerometer readings from the accelerometer that describe real-time motion of the vehicle, and wherein the computer-implemented method further comprises:

performing, by one or more processors, an analysis of the accelerometer readings to determine that the vehicle is being operated by the driver in the erratic manner.

4. The computer-implemented method of claim 1, wherein the risk R is computed based on a degree of erratic driving of the vehicle detected by the at least one sensor associated with the vehicle.

5. The computer-implemented method of claim 1, wherein the risk R is computed based on one or more factors from a group of factors consisting of real-time weather conditions at a current location of the vehicle, real-time road conditions at the current location of the vehicle, a time of day at the current location of the vehicle, and real-time traffic conditions at the current location of the vehicle.

6. The computer-implemented method of claim 1, wherein the risk R is computed based on predicted traffic conditions at a future location of the vehicle.

7. The computer-implemented method of claim 1, wherein the aerial drone is docked within a predetermined distance of a current location of the vehicle.

8. The computer-implemented method of claim 1, wherein the action that ameliorates the erratic manner in which the vehicle is being driven is a flashing of a message from a display on the aerial drone.

9. The computer-implemented method of claim 1, further comprising:

receiving, by one or more processors, a vibration sensor signal from a vibration sensor on the vehicle indicating that the vehicle is traveling over ingrained warning dents on a roadway on which the vehicle is traveling for longer than a predefined length of time; and in response to receiving the vibration sensor signal from the vibration sensor on the vehicle indicating that the vehicle is traveling over ingrained warning dents on the roadway on which the vehicle is traveling for longer than the predefined length of time, deploying, by one or more processors, the aerial drone to the current location of the vehicle.

10. The computer-implemented method of claim 1, wherein the action that causes the amelioration of the erratic manner in which the vehicle is being driven is a broadcast via a speaker on the aerial drone of a rumbling sound that simulates a sound caused by an interaction between tires on the vehicle and ingrained warning dents on a roadway on which the vehicle is traveling.

11. The computer-implemented method of claim 1, wherein the action that causes the amelioration of the erratic manner in which the vehicle is being driven is a transmission of a radio message to the driver, wherein the radio message causes a radio on the vehicle to generate a verbal instruction to the driver to alter how the vehicle is being driven.

12. The computer-implemented method of claim 1, wherein the action that causes the amelioration of the erratic manner in which the vehicle is being driven is a transmission of a radio message to the driver, wherein the radio message causes a radio on the vehicle to emit a sound of a predetermined frequency/volume that will capture the attention of the driver.

13. The computer-implemented method of claim 1, wherein the at least one sensor is a video camera, wherein the sensor readings are a video feed from the video camera, and wherein the computer-implemented method further comprises:

performing, by one or more processors, a video analysis of the video feed to determine that the driver is in a physical position that indicates a lack of control of the vehicle; and determining, by one or more processors, that the erratic manner in which the vehicle is being driven is due to the lack of control of the vehicle being demonstrated by the driver.

14. The computer-implemented method of claim 1, wherein the at least one sensor is a biometric sensor, wherein the biometric sensor generates biometric sensor readings for the driver in real time, and wherein the computer-implemented method further comprises:

performing, by one or more processors, an analysis of the biometric sensor readings to determine that the driver is in a physiological condition that indicates a lack of ability by the driver to control the vehicle; and determining, by one or more processors, that the erratic manner in which the vehicle is being driven is due to the lack of ability by the driver to control the vehicle.

15. The computer-implemented method of claim 1, wherein the vehicle is a first vehicle, wherein the driver is a first driver, and wherein the computer-implemented further comprises:

assigning, by one or more processors, the first driver of the first vehicle to a cohort of other drivers that share a set of common traits with the first driver, wherein the other drivers historically have driven other vehicles;

identifying, by one or more processors, prior historical actions that aerial drones have performed to cause an amelioration of erratic movements of the other vehicles that were driven by the other drivers; and transmitting, by one or more processors, instructions to the aerial drone to perform one or more of the prior historical actions.

16. The computer-implemented method of claim 1, further comprising:

determining, by one or more processors, that the erratic manner in which the vehicle is being driven is being caused by a software error in a control system for the vehicle; and in response to determining that the erratic manner in which the vehicle is being driven is being caused by the software error in the control system for the vehicle, transmitting, by one or more processors, instructions to the vehicle to correct the software error.

17. A computer program product for an aerial drone to ameliorate an erratic manner in which a vehicle is being driven, the computer program product comprising a computer readable storage device having program instructions embodied therewith, the program instructions readable and executable by a computer to computer to perform a method comprising:

receiving, from at least one sensor associated with a vehicle, sensor readings indicating that the vehicle is being operated by a driver in an erratic manner;

computing a risk R associated with the driver operating the vehicle in the erratic manner;

determining, by one or more processors, whether the risk R is above a predefined threshold T;

in response to determining that the risk R is above the predefined threshold T, deploying an aerial drone to a current location of the vehicle; and transmitting instructions to the aerial drone to perform an action that causes an amelioration of the erratic manner in which the vehicle is being driven.

18. The computer program product of claim 17, wherein the method further comprises:

assigning the driver of the vehicle to a cohort of other drivers that share a set of common traits with the driver, wherein the other drivers historically have driven other vehicles;

identifying prior historical actions that aerial drones have performed to cause an amelioration of erratic movements of the other vehicles that were driven by the other drivers; and transmitting instructions to the aerial drone to perform one or more of the prior historical actions.

19. The computer program product of claim 17, wherein the program instructions are provided as a service in a cloud environment.

20. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to receive, from at least one sensor associated with a vehicle, sensor readings indicating that the vehicle is being operated by a driver in an erratic manner;

program instructions to compute a risk R associated with the driver operating the vehicle in the erratic manner;

program instructions to determine whether the risk R is above a predefined threshold T;

program instructions to, in response to determining that the risk R is above the predefined threshold T, deploy an aerial drone to a current location of the vehicle; and program instructions to transmit instructions to the aerial drone to perform an action that causes an amelioration of the erratic manner in which the vehicle is being driven.

\* \* \* \* \*